(12) United States Patent
Keam et al.

(10) Patent No.: US 7,713,116 B2
(45) Date of Patent: May 11, 2010

(54) INVENTORY MANAGEMENT OF VIRTUAL ITEMS IN COMPUTER GAMES

(75) Inventors: Nigel S. Keam, Redmond, WA (US); Leon Pryor, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 839 days.

(21) Appl. No.: 10/611,799

(22) Filed: Jun. 30, 2003

(65) Prior Publication Data

US 2004/0266505 A1 Dec. 30, 2004

(51) Int. Cl.
*A63F 13/00* (2006.01)

(52) U.S. Cl. .............................. 463/1; 463/31; 463/32; 463/34; 273/108.1; 273/317.1; 345/419; 345/619; 715/706; 715/757; 715/764

(58) Field of Classification Search ................. 463/1–5, 463/7–9, 30–34, 36–39, 40–43, 49–57; 273/148 R, 273/148 B, 309, 317.1, 340, 348, 361–367, 273/108.1, 127 R; 345/1.1–3.4, 473–475, 345/618–619, 629, 156, 157, 160, 419; 715/706, 715/738, 757, 762–764
See application file for complete search history.

(56) References Cited

U.S. PATENT DOCUMENTS

| | | | | |
|---|---|---|---|---|
| 4,738,451 A | * | 4/1988 | Logg | ............................. 463/2 |
| 5,566,295 A | * | 10/1996 | Cypher et al. | ............... 715/763 |
| 5,710,894 A | * | 1/1998 | Maulsby et al. | ............. 715/763 |
| 5,838,317 A | * | 11/1998 | Bolnick et al. | .............. 715/764 |
| 5,872,844 A | | 2/1999 | Yacobi | |
| 5,878,138 A | | 3/1999 | Yacobi | |
| 6,009,458 A | * | 12/1999 | Hawkins et al. | ............. 709/203 |
| 6,119,229 A | * | 9/2000 | Martinez et al. | .............. 726/28 |
| 6,165,072 A | | 12/2000 | Davis et al. | |
| 6,200,216 B1 | * | 3/2001 | Peppel | .......................... 463/1 |
| 6,268,864 B1 | * | 7/2001 | Chen et al. | ................... 345/428 |
| 6,278,466 B1 | * | 8/2001 | Chen | ........................... 345/473 |
| 6,304,259 B1 | * | 10/2001 | DeStefano | ................... 715/805 |
| 6,308,187 B1 | * | 10/2001 | DeStefano | ................... 715/234 |
| 6,317,748 B1 | | 11/2001 | Menzies et al. | |
| 6,442,620 B1 | | 8/2002 | Thatte et al. | |
| 6,526,416 B1 | | 2/2003 | Long | |
| 6,574,736 B1 | | 6/2003 | Andrews | |
| 6,591,250 B1 | * | 7/2003 | Johnson et al. | ................ 705/51 |

(Continued)

OTHER PUBLICATIONS

Seven Kingdoms II: The Fryhtan Wars publisher Ubisoft (released Jul. 1999), game manual.*

(Continued)

*Primary Examiner*—Peter DungBa Vo
*Assistant Examiner*—Arthur O. Hall
(74) *Attorney, Agent, or Firm*—Lee & Hayes, PLLC

(57) ABSTRACT

Within a game, a filter is applied to a game inventory based on an attribute of each one of a plurality of virtual items. The filter can be player defined, game developer defined, system programmer defined, or a combination thereof. In certain versions, the virtual items that satisfy the query provided by the filter are displayed to the player. The player can thereupon access any one of the virtual items that are represented by the icons that satisfy the filtering query. In one version, the attributes of the virtual items can be changed using the filtering game inventory system.

38 Claims, 5 Drawing Sheets

U.S. PATENT DOCUMENTS

| | | | |
|---|---|---|---|
| 6,873,336 B1* | 3/2005 | Sailus et al. | 345/581 |
| 6,904,410 B1* | 6/2005 | Weiss et al. | 705/27 |
| 6,979,267 B2 | 12/2005 | Leen et al. | |
| 7,169,050 B1 | 1/2007 | Tyler | |
| 7,249,139 B2* | 7/2007 | Chuah et al. | 707/102 |
| 7,254,785 B2* | 8/2007 | Reed | 715/834 |
| 7,275,987 B2* | 10/2007 | Shimakawa et al. | 463/9 |
| 7,409,647 B2* | 8/2008 | Elber et al. | 715/848 |
| 7,432,940 B2* | 10/2008 | Brook et al. | 345/629 |
| 7,610,394 B2* | 10/2009 | Katinsky et al. | 709/231 |
| 2001/0044339 A1 | 11/2001 | Cordero et al. | |
| 2002/0022516 A1* | 2/2002 | Forden | 463/32 |
| 2002/0142847 A1* | 10/2002 | Thompson et al. | 463/43 |
| 2003/0045359 A1 | 3/2003 | Leen et al. | |
| 2003/0216962 A1 | 11/2003 | Heller et al. | |
| 2004/0002380 A1* | 1/2004 | Brosnan et al. | 463/32 |
| 2004/0078572 A1 | 4/2004 | Pearson et al. | |
| 2004/0137975 A1* | 7/2004 | Yamada et al. | 463/1 |
| 2004/0242321 A1 | 12/2004 | Overton | |

OTHER PUBLICATIONS

Motor City Online: publisher, EA Games (released Oct. 10, 2001).*

Trevor Chan, Seven Kingdoms II: The Fryhtan Wars, Jul. 1999, Ubisoft, 1, 7, 17, 22-25.*

Danelektro, Strategy Guide: Motor City Online, Apr. 30, 2003, 1-2.*

IGN Staff, Motor City Online, Feb. 12, 2001, IGN, 1-4.*

Kee, "Cheating in Multi-Player Gaming", New Straits Times, Kuala Lupur, Jun. 23, 2003, p. 25 (4 pages). (retrived online on Mar. 22, 2005) URL:http://proquest.umi.com/pqdweb?did=53637433&sid=3&Fmt=4&clientId=19649&RQT=309&VName=PQD.

Pritchard, "Internet Cheating: How to Hurt the Hackers". Game Developer, Jun. 2002; vol. 7, Issue 6, pp. 28-40, (online) (retrived Mar. 22, 2005) URL:http://proquest.umi.com/pqdweb?did+53637433&sid+3&Fmt=4&clientId=19649&RQT=309&VName=PQD.

Smed et al., "Aspects of Networking in Multiplayer Computer Games", The Electronic Library, 2002, No. 20, vol. 2, pp. 87-97. (online) (retrieved Mar. 22, 2005) <URL:http://proquest.umi.com./pqdweb?did=208459961&sid=2&Fmt=4&clientId=19649&RQT=309&VName=PQD>.

Yan et al., "Security Issues in Online Games", The Electronic Library, 2002; No. 20, vol. 2, pp. 125-133, 177. (online) (retrived Mar. 22, 2005) URL:http://proquest.umi.com./pqdweb?did=208466111&Fmt=3&clientId=19649&RQT=PQD>.

"Cheating in Counter-Strike", retrieved on Dec. 20, 2006, at <<http://en.wikipedia.org/wiki/Cheatiing_in_counter-strike>>, The Free Encyclopeida, Dec. 2006, pp. 1-18.

"Counter-Strike", retrieved on Dec. 13, 2006, at <<http://en.wikipedia.org/wiki/Counter-Strike>>, The Free Encyclopedia, pp. 1-5.

"CSGuard", retrieved on Jul. 16, 2002, at <<http://www.unitedadmins.com/CSGuard.aspx>>, UnitedAdmins.com, 2002, pp. 1.

Gasior, "Valve Bans Online Cheaters", retrieved on May 9, 2006, at <<http://techreport.com/news_reply.x/4010>>, The Tech Report, Aug. 26, 2002, pp. 1-7.

Gibson, "CS Cheaters Beware", retrieved on May 9, 2006, at <<http://www.shacknews.com/onearticle.x/21540>>, Shacknew, Jul. 16, 2002, pp. 1-2.

"HLGuard", retrieved on Jul. 16, 2002, at <<http:www.unitedadmins.com/HLGuard.aspx>>, UnitedAdmins.com, 2002, pp. 1.

"How Does VAC/VSM Work?", retrieved on May 9, 2009, at <<http://mircscrips.de/pn/html/modules.php?op=modload&name=FAQ&file=index&myfaq=yes&id_cat=9>>, CSH-Network, pp. 1-4.

"Online Cheaters Face Games Ban", retrieved on May 9, 2006, at <<http://news.bbc.co.uk/1/hi/technology/2221335.stm>>, BBC News, Aug. 29, 2002, pp. 1-3.

"The Valve Anti-Cheating Module", retrieved on May 9, 2006, at <<http://server.counter-strike.net/server.php?cmd=VAC>>, The Official Counter-Strike Server Admin Resource, pp. 1-6.

"VAC Security Module Updated Again", retrieved on Aug. 30, 2002, at <<http://www.my-cs.com/main.cfm>>, My-CS.com Counter-Strike News Maps etc, Aug. 22, 2002, pp. 1.

"Valve Anti-Cheat", retrieved on Dec. 20, 2006, at <<http://en.wikipedia.org/wiki/Valve_Anti-Cheat>>, The Free Encylopedia, December 8, 2006, pp. 1-4.

* cited by examiner

INVENTORY MANAGEMENT OF VIRTUAL ITEMS IN COMPUTER GAMES

TECHNICAL FIELD

Certain embodiments of this invention relate to games, and more particularly to inventory management for virtual items within games.

BACKGROUND

In computer games, the player is often provided with the ability to select between many choices of virtual property items. Examples of such virtual property includes valuables (money, valuable metals, gems, etc.), weapons, spell components, and armor. For a particular game, a player may be provided with a large number of virtual items. Remembering where each of these virtual items are located becomes difficult and challenging, especially when the player has a large number of virtual items (perhaps in the hundreds or thousands in certain games).

Within games, virtual items are typically arranged in an inventory in such a manner that the player can access specific virtual items. The order of the inventory can vary from game to game. For example, a number of virtual items can be accessed from an inventory that is arranged in one or more "bags" or "packages"; the virtual items can be arranged within the bags or packages in a manner analogous to managing files within a computer directory. Accessing virtual items within existing inventory systems (one of which is descriptively referred to as a "pack within pack") becomes quite challenging considering the number of virtual items that many players maintain in their inventories. Players often forget the package in which a particular virtual item is located, and thereby find it difficult to locate and use many of their items. In more complex games, such virtual items can be quite expensive, and not being able to quickly access certain virtual items within a game can be frustrating and can reduce a player's performance within that game.

For games to become easier to use and more enjoyable, it would be desirable to provide an improved inventory system.

SUMMARY

This disclosure relates to inventory systems for virtual objects within computer games. In certain versions, within a game, a filter is applied to the entire game inventory based on an attribute of each one of a plurality of virtual items. In different versions, the filter can be player defined, game developer defined, or a combination thereof. The virtual items that satisfy the attributes of the filter are then displayed to the player. The player can thereupon access any one of the virtual items that are represented by the icons that satisfy that particular filtering query.

BRIEF DESCRIPTION OF THE DRAWINGS

The same numbers are used throughout the drawings to reference like features and components.

DETAILED DESCRIPTION

In many PC and console games, particularly so-called role playing games (RPGs) and Massive Multiplayer Online Role Playing Games (MMORPGs), players may possess a large number of virtual items of property that they maintain in a virtual inventory in a manner such that the virtual items can be accessed. The players can carry, access, defend themselves with, fight other characters with, sell, barter, or otherwise use these virtual items. Illustrative examples of RPGs and MMORPGs include, but are not limited to, Asheron's Call (produced by Microsoft) and Everquest.

Experienced players/users of many games often collect many virtual items during each game. As such, some of these virtual items are quite valuable and some virtual items have sold for thousands of dollars. Examples of virtual items include, but are not limited to, valuables (money, valuable metals or gems, etc.), weapons, spell components, defense components, and armor.

The inventory may be arranged into a smaller set that can be stored in one or more filters that appear to the player as "packs" or "bags". The inventory maintains virtual items for retrieval as set forth in the filter. In this disclosure, the term "player" applies to both the human who is playing the game and his/her computer generated representation within the game, unless otherwise indicated. This disclosure provides a mechanism by which players can quickly and easily access their virtual items within a game by using appropriate filters.

Figure 1:
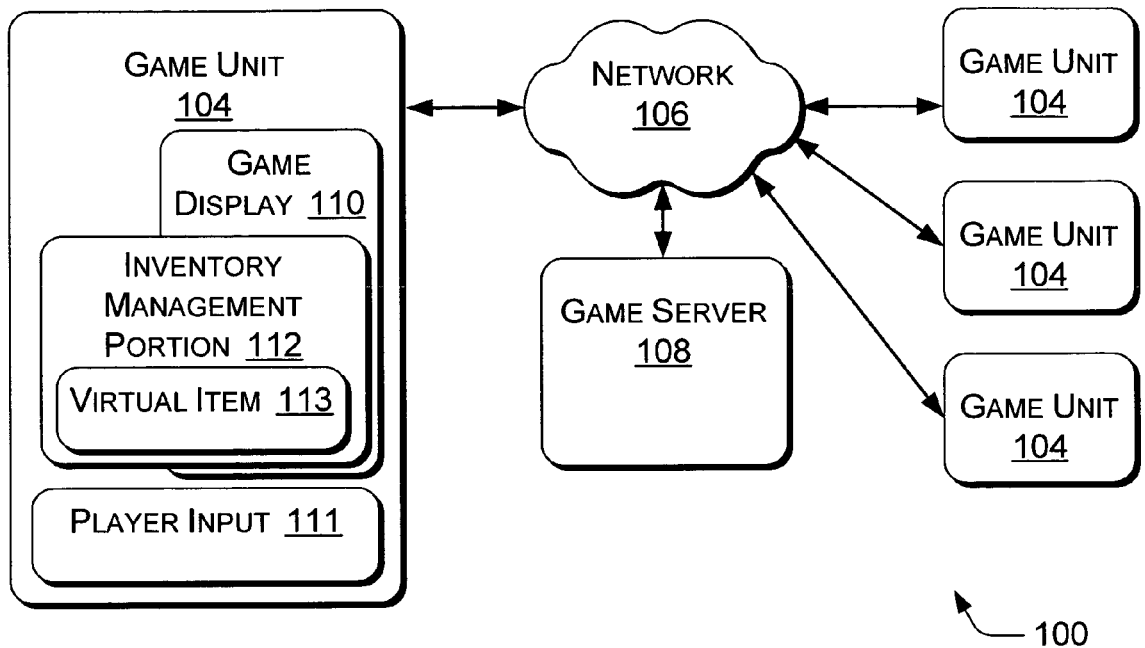
FIG. 1 is a block diagram of an embodiment of a game system.

FIG. 1 shows one embodiment of a game system 100. The game system 100 includes a plurality of game units 104, a network 106, and at least one game server 108. Each game unit 104 is computer-based, and communicates with data via the network 106 to the game server 108 as is generally known with computer systems and computer game systems. The game unit 104 may include, for example, a game console, a hand-held electronic or computer device, a personal computer, etc.

The network 106 can include, for example, the Internet, corporate intranets, Local Area Networks (LAN), Wide Area Networks (WAN), wired network portions, wireless network portions, and any other known desired network configuration. In effect, any known networked or stand-alone computer configuration (be it game-based, non-game based, or mixed) that is used to provide a game system 100 is within the intended scope of the present disclosure.

Figure 4:
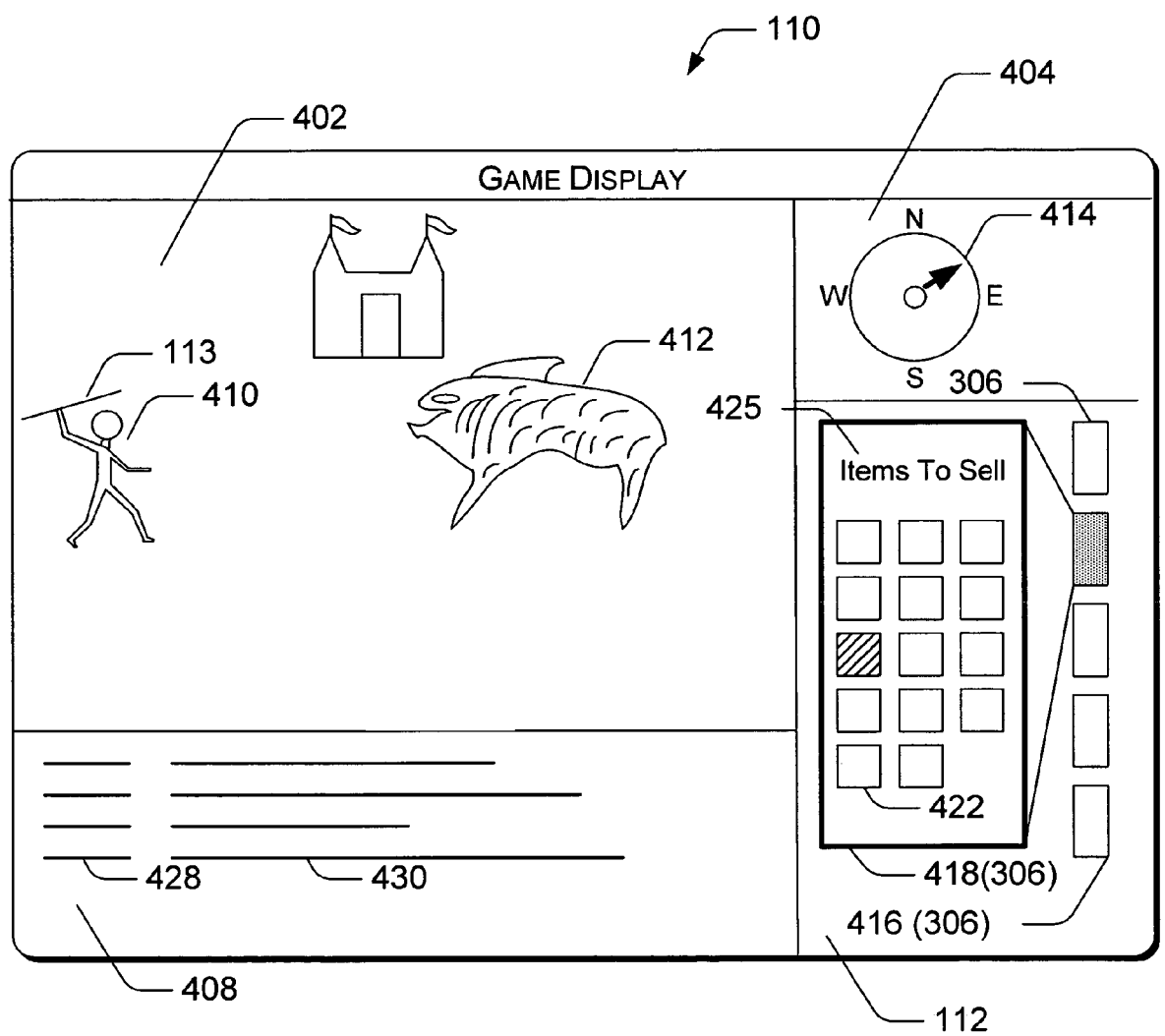
FIG. 4 is an embodiment of a game display from the game system shown in FIG. 1 or 2.

The game server 108 can include a single computer configured as a personal computer, a mainframe, a laptop, or a server computer. Alternatively, a large number of computers can be interconnected (for example to form a "server farm"). All of the computers, servers, etc. that are providing the game appear to the players to operate in a similar manner as a single powerful computer. A group of game servers 108 at such a server farm may be devoted to a single game, or alternatively any server may be shared to provide the computing resources for a smaller game. The game server 108 handles the processing and data manipulation associated with complex games in which a large number of game units 104 are typically in communication with the game server(s) 108 at any given time. Within the game being played by the game system, such characters 412 as monsters (as shown in FIG. 4), villains, vendors, etc. that are part of the game may interact with the players that are participating in the game. The computer-generated players embodying the human players may enter and leave the game being played on the game system 100 as the human player signs on and signs off of their game units 104.

Each game unit 104 receives input from each player, and presents output to be displayed to each player. It is envisioned that the output could include digital pictures, video, audio, etc. As shown in FIG. 1, each game unit 104 includes a game display 110 and player input 111. The game display can at least partially contain the inventory management portion 112. For example, the aspects of the inventory management portion that relate to displaying, maintaining, and accessing the items are within the game display. Other portions of the inventory management portion may not be contained within the game display. The player input 111 includes, for example, handheld controllers, mice, keyboards, joysticks, menus, and other known computer input devices by which the human player may input their commands into the game system 100. The commands are transmitted within the game system 100 in the form of data.

In such RPGs, the game sever 108 makes many of the decisions relating to the game system 100. Using this configuration, different game characters and different game players can interact in the same game. Therefore, multiple players can view and interact with other players within the same game that are each providing input from different game units 104. In larger game systems, hundreds or thousands of players can be playing the game simultaneously. In many versions, the game server 108 performs most of the processing associated with the game system 100 (i.e., the actions and decisions associated with the game are primarily performed at the game server 108).

The inventory management portion 112 includes a list or directory of virtual items 113 in a game over which a player has control. These virtual items 113 may be on the player's person, in his/her bags or packages (which may be considered as containers for items of virtual property), in/on a vehicle/mount/animal that the virtual player has maintained on behalf of the player (in a house, apartment, safety deposit system).

The virtual items 113 are organized in an inventory by a plurality of filters with each filter being configured as a virtual "bag" that is contained in the inventory management portion 112 and in which a player stores their virtual items. The filters are each configured as queries. The results of a search using these filters are displayed to the player whenever the inventory management portion 112 of the game display 110 is updated. Certain players may find current inventory systems to be confusing and/or take too much time to access. These aspects can take away from the human player's enjoyment of the game.

Figure 2:
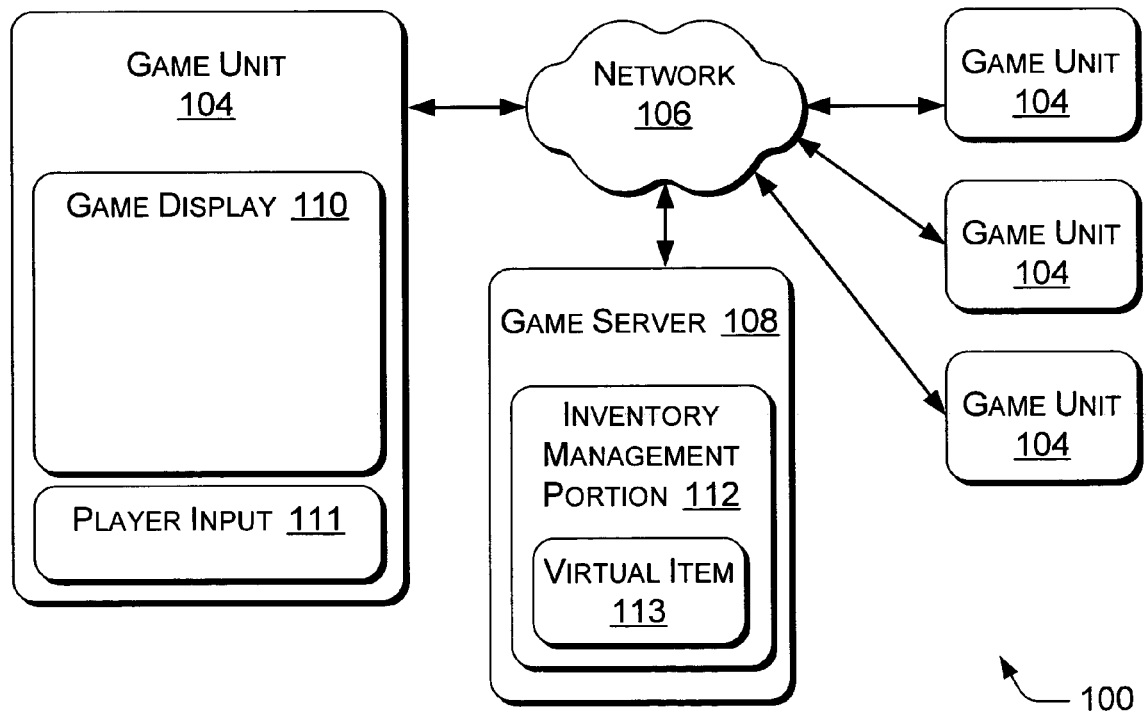
FIG. 2 is a block diagram of another embodiment of the game system.

FIG. 2 shows another embodiment of computer-based game system 100. The FIG. 2 embodiment of computer-based game system is similar to the embodiment described relative to FIG. 1, excepting that in FIG. 2, the inventory management portion 112 (including one or more virtual items 113) is at least partially transferred to the game server 108 from the game unit 104 (where it is located in the embodiment shown in FIG. 1).

It is envisioned that in another embodiment, the inventory management portion 112 can be shared between the game server 108 and the game unit 104. As evidenced from FIGS. 1 and 2, the inventory management portion 112 can be located in any location that can be accessed by a player. It is envisioned that the computer-based game system can be provided in a stand-alone environment (not shown, but well understood). As such, the inventory management portion 112 can also be maintained on a stand-alone computer.

There are a number of terms that are provided in this disclosure that are now described. For the purpose of this disclosure, a game is considered as a computer or console game to be played on a computer environment as described relative to FIG. 5. Many applicable games include Role Playing Games (RPGs) or Massively Multiplayer Online Role Playing Games (MMORPGs). Applicable games also include stand-alone games in which a player is playing a game on a stand-alone computer. As such, the game within the scope of the present disclosure may be played on virtually any computer system or configuration. Within this disclosure, the inventory management portion 112 permits accessing and use of virtual items 113 within the computer/console by a player of that game. In this disclosure, the term "player" is inclusive of the computer-generated incarnation of a human player that controls or manipulates the game in addition to the human player.

Figure 3:
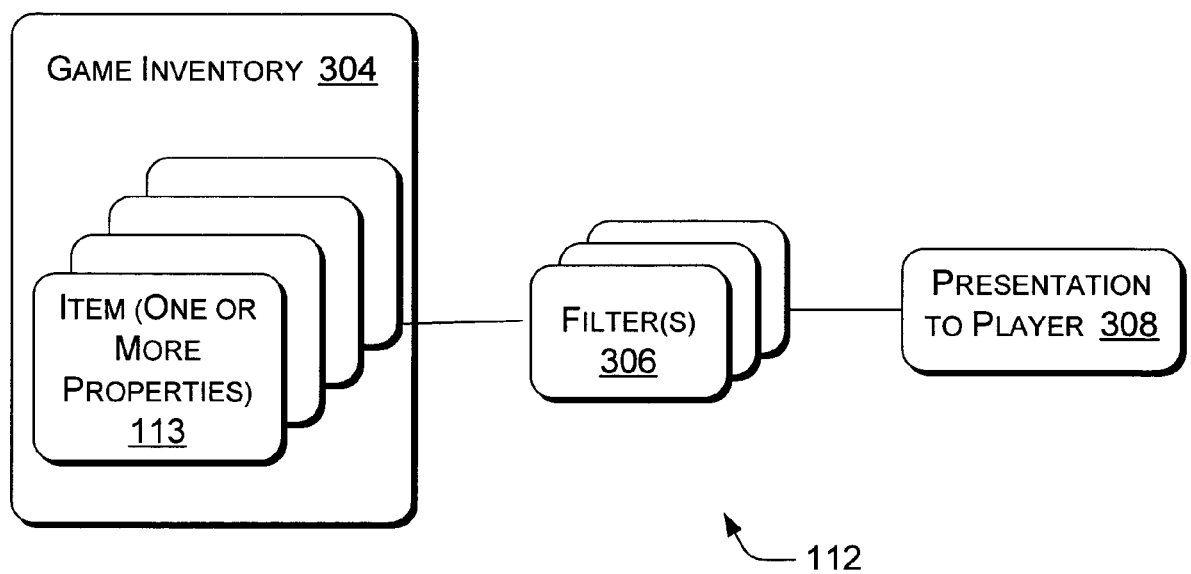
FIG. 3 is a functional block diagram of an embodiment of the game system as shown in FIGS. 1 and 2.

FIG. 3 shows one generalized embodiment of an inventory management portion 112, certain versions of which are shown in FIGS. 1 and 2. The inventory management portion 112 includes a game inventory portion 304, a filter 306, and a presentation to player portion 308. The game inventory portion 304 displays the games in an ordered manner (as desired by the player) in response to received player input. It is envisioned that the game inventory portion 304 can be located at the game server 108 and/or the game unit 104 as shown respectively in FIGS. 1 and 2.

Each filter 306 filters the virtual items according to certain limitations provided by a query such as provided in database technology such as Structured Query Language (SQL). The inventory management portion 112 uses a suitable user interface (UI) as set forth by the player, a game developer, or a third party in a manner that can be monitored/accessed by the player and/or the game system. The filters 306 are displayed to the player using the inventory management portion 112.

A filter 306 can be selected by the player to select and display icons 422 (as shown in FIG. 4) representing the virtual items within that filter. The presentation to the player portion 308 is envisioned to be integrated into the game unit 104 in such a manner that the virtual items of the inventory can be seen by the player.

An inventoried virtual item icon 422 includes one or more single virtual items 113, or a number of identical virtual items 113, that are each in the player's possession. A player can possess a potentially large number of virtual items 113 (tens, hundred, or even thousands depending on the game and the player). These virtual items 113 can include such varied computer-generated components as pieces of armor, weapons, valuables, books, clothing, spell-casting components, potions, etc. These virtual items 113 may typically be obtained during the game from other players through virtual trade, virtual conquest, virtually stealing the bounty from killed or defeated (computer-controlled and generated) monsters, villain, or other game characters 412. The inventory management portion 112 that is based on filters provides a display of certain virtual items 113 in an arrangement as selected by the human player.

The virtual items 113 of personal property can be crafted from other items or raw materials, or obtained from Non-Player-Characters (NPCs) e.g. shopkeepers or monsters 412. The virtual items 113 of personal property may also be sold to NPCs or players, converted to other items or raw materials, sold/traded with other players, abandoned, used, maintained and/or accessed within the rules of the game. As such, actions that a player can take with virtual items 113 are meant to roughly model actual actions that a human could take with real objects.

A virtual item 113 is considered as having an attribute (or a property) within the game. Each virtual item 113 will typically have a number of attributes such as its value, weight, size. Virtual items can be filtered according to their attributes type. Some attributes may be universal to all items (everything has some value even if it is assigned a null value). Other attributes are unique to specific classes of virtual items 113 e.g. "maximum damage" may be an attribute which all weapons share.

Each virtual item 113 has a particular set of attributes or types so a computer running the game can compare or categorize those with similar attributes. Displayed virtual items 113 can then be grouped by how the players wish to access those virtual items 113. Examples of types of virtual items 113 include, but are not limited to: numeric types, Boolean types, enumeration, and text.

The numeric type of a virtual item 113 describes a quantifiable attribute of the virtual item (such as the number or the weight of a particular virtual item). The Boolean type of a virtual item 113 may include but is not limited to a flag or tag (such as a virtual item "should be sold" or "is a healing item") that determines an attribute of the virtual item.

Flag types may be viewed as looking for a yes or no answer pertaining to an attribute of the virtual item, and are therefore relatively easy to code. Examples of flags describe, for example, whether the player should sell that virtual item.

The enumeration type of a virtual item 113 includes, e.g., the type of virtual item, or a material that a virtual item 113 is formed from. Enumeration types typically include a finite list, such as gold, silver, wood, cloth, clay, etc. The text (string) type of virtual items 113 may be used to provide an inscription to be displayed on the actual displayed virtual item.

The filter 306 may be viewed as a determiner to which the virtual item's properties within that filter will conform. The filter 306 will also probably have a name and perhaps a symbolic representation. Filters 306 may be structured as query statements such as is known in Structured Query Language (SQL). However, the player may also use a user interface (UI) to create or modify a filter instead of the SQL coding. As such, the UI can be provided using one or more slides, menus, or checkboxes (not shown, but well known with UIs) to simplify the creation or modification of the filter. Examples of filters 306 include, but are not limited to, such queries as virtual items 113 that are to be sold and/or bartered, virtual items that are weapons against air monsters, virtual items that are weapons against sea monsters, virtual items that are made of silver or other materials, etc.

The embodiment of filters 306 can be accessed using a filter icon 416 as described relative to FIG. 4. It is emphasized that any embodiment of a user interface device that can be used in the inventory management portion 112 to allow the player to access virtual items using the filter 306 is within the intended scope of the present disclosure. For example, such user interface devices as (but not limited to) radio buttons, drop-down menus, check boxes, and other types of icons may be used to access virtual items using a plurality of filters 306 within the inventory management portion 112.

As the inventory management portion 112 searches it and considers the attributes of different ones of the virtual items 113. Each virtual item 113 can be assigned designations based on its name, its symbol, and its criteria. For example, a sword virtual item may be provided the name "sword weapon", have a symbol of a sword, and have a criteria of "Item Type"="Weapon". A virtual item 113 may have a name "Sell at store", a symbol of one or more dollar bills or coins, and criteria of: a) "Value">100, and b) "Don't sell"=false.

One aspect of the present disclosure permits viewing the entire inventory of virtual items 113 as organized by their attributes/properties by using applicable filters 306. The filters 306 can be represented in any desired manner, but organize the virtual items 113 by using a suitable query such as from a player or game programmer. For example, the filters 306 can be provided by series of packages, bags, buttons, menus, icons, or any other known User Interface (UI) mechanism. The virtual items 113 can be manipulated or ordered using representations of the filters 306. Such filters 306 may be considered as providing a user-defined user interface (UI) based on the criteria set forth by each player/user defined filter 306.

A player can design their own filter(s) 306 based on the desired attributes. The filters appear as inventory "packs" or "bags". The use of such filters 306 makes it easier for a player to maintain the virtual items in a desired order based on their attributes. Filters 306 can be defined by anyone (the game system, the player, and even a third party) and can include any attribute. For example, attributes for weapons are maximum damage, minimum damage, weight (the player has to have certain strength to perform certain tasks as indicated by the weight value), material, skill modifier, skill requirement, race requirements (have to be an Ogre). A player can make decisions on the virtual items 113 based on the attributes of the filter 306 (e.g., decide where to keep a virtual item, whether to keep a virtual item).

The query statement (that may be input using a UI) that defines each filter 306 can be changed/modified to change the attribute of the filter 306. For example, a player-defined filter 306 can be changed by player modification from "a virtual item that is a valuable which is made from gold" to "a virtual item that is a valuables which is made from copper". A large variety of such potential player modifications would be known to those skilled in user interfaces, all of which are within the intended scope of the present disclosure.

FIG. 4 shows an exemplary version of a game display 110 such as may include the inventory management portion 112 as described in this disclosure. The game display 110 additionally includes the inventory management portion 112, an orientation portion 404, a graphical scene describer portion 402, and a communication portion 408. The orientation portion 404 illustrates where the player is within the virtual world, and may further include a compass 414, a map, or the like.

The graphical scene describer 402 illustrates the virtual player 410 interacting within their virtual world in which they may encounter other players and/or characters. The communication portion 408 illustrates text of the communications occurring between the player, other players, characters 412 such as monsters, and the virtual world. The communication person includes labeled portion 428 and a text portion 430. The labeled portion describes which player/character is stating a line. The text portion 430 includes an outline text of the pertinent communications occurring within the virtual world.

It is to be understood that the embodiment of the game display 110 as shown in FIG. 4 includes a separate inventory management portion 112, orientation portion 404, graphical scene describer portion 402, and communication portion 408. Certain ones of these portions 112, 404, 402, and/or 408 may be combined/merged using techniques that are well understood to allow the player to observe a considerable amount of information in any desired configuration as desired by the player(s). In addition, certain of the portions 112, 404, 402, and/or 408 may be reduced or eliminated as desired while remaining within the intended scope of the present disclosure.

An example of a filter 306 relates to "items the player intends to sell". To display the items that that seller intends to sell, the player can click on the icon representing that filter 306. A list of the virtual items 113 in the inventory management portion 112 correspond to a query, such as those virtual items 113 in which an "I intend to sell" flag is set. If the player decides he/she doesn't want to sell a particular item after all, the player can deselect the item in a manner that removes the flag. For instance, the virtual item icon 422 can be dragged out of the selected inventoried package display 418 being displayed and dropped in some neutral area or into an inconsistent inventory filter icon 416. The game uses this action by the human player as an indication to clear the flag for that item so the item no longer matches the filter 306 indicated by the selected inventoried package display 418 or inventory filter icon 416.

Instead of displaying each tool, certain embodiments of the inventory management portion 112 run the filter 306 over the entire inventory, and only display those items that match the filter query. The filtering process (corresponding to the filter query) may be performed within the inventory management portion 112 using a graphical representation. Use of certain versions of the inventory management portion 112 that includes filters 306 will behave differently. Each filter may act to classify important aspects of the virtual items that are contained within that filter.

Each filter may include a distinct text description. For example, the selected inventoried package display 418 as shown in FIG. 4 includes a label 425 stating "items to sell". Alternate exemplary labels 425 may state weapons against air monsters, weapons against sea monsters, items made of gold, etc.

The filtering techniques provided by certain embodiments of game systems 100 described herein can use such filters 306 (as indicated by the inventory filter icon 416) to organize virtual item icons 422. Certain virtual items 113 are therefore arranged in particular ones of the respective filters 306 according to their attributes. Since virtual items 113 have multiple attributes, it is possible that a single virtual item can be maintained in, and accessible from, a plurality of inventory filter icon 416 simultaneously. For example, a gold spear virtual item 113 may be maintained in or accessed using one inventory filter icon 416 that filters gold items, and may simultaneously be maintained in and accessed from another inventory filter icon 416 that filters weapons.

In prior-art inventory systems that do not use filters and filtering techniques, if a player does not recall which pack a particular item is located within, then the player has to search through all of his packs to determine where a particular virtual item is maintained. It is common in such prior-art systems to accidentally sell or destroy desirable virtual items. To consider which virtual item to sell from the large inventory of virtual items (perhaps tens or thousands in certain instances), the player has to search through each pack and consider whether to sell each item individually.

The embodiment of inventory management portion 112 as described relative to FIG. 4 that include filters as described in this disclosure, can organize by filtering, accessing, and displaying virtual items 113. The filter 306 criteria for each filter can be player/user-defined, game developer defined, third party, or a combination. The human player therefore can filter each virtual item icons 422 representing a virtual item 113 based on its attributes, and sell only those virtual items 113 that have attributes that correspond to what the player intends to sell. As such, the possibility of inadvertent selling of desired virtual items 113 is greatly reduced.

The virtual items 113 may be filtered within the inventory management portion 112 to sell, remove, keep, or perform some other action. Such selling or trading can be done within the game such as with another virtual player or outside of the game such as over the Internet or other network to another human player. The attributes of the virtual items 113 in the prior-art inventory systems may not be readily apparent to either the seller of the buyer.

One aspect of the disclosure is that any virtual item icon 422 representing a virtual item 113 could appear in one or many packs. For example, a game developer, a system programmer, and/or a player may construct a filter 306 for "virtual items 113 made from gold". A game developer, a system programmer, and/or a player could construct a filter 306 for "virtual items 113 that are weapons". A virtual item icon 422 representing the golden spear would satisfy the results of both filters 306, and therefore would appear in both filters 306. Each virtual item 113 has only one group of attributes. The virtual item icons 422 each representing a virtual item 113 are categorized based on attributes. Certain attributes may or may not be attached to specific items.

With another list of virtual item icons 422 representing virtual items 113 displayed (e.g. "all items" or "items worth over $100), a virtual item 113 is selected which the player decides to sell. The virtual item icon 422 representing the virtual item 113 is dragged and dropped onto an inventory filter 306 representing those virtual items that the player intends to sell. This has the result (in the game program) of setting the "virtual items 113 the player intend to sell" flag for that particular virtual item. Note that the virtual item 113 still shows up in the original list since it is still over $100 value or one of "all virtual items 113".

Table 1 provides one exemplary version of a virtual item attribute list that lists the various attributes, and their types, that may be used for filtering the virtual items.

| Attributes | Types |
| --- | --- |
| Category | Enumeration |
| Minimum damage | Numeric |
| Maximum Damage | Numeric |
| Attribute Weight | Numeric |
| Attribute Value | Numeric |
| Attribute Material | Enumeration |
| Skill Modifier Requirement | Flag |
| Should Player Sell | Flag |

One embodiment of a filter 306 that can be used to inventory virtual items 113 is shown in Table 2. The filter 306 may be used in conjunction with the inventory filter icon 416 as shown in FIG. 4. The filter 306 shown in Table 2 may be considered as a query. In other words, each virtual item 113 that has a value greater than $100, and which the flag "should the player sell this?" is indicated as false will appear displayed as a virtual item icon 422 in the selected inventoried package display 418 of the particular inventory filter icon 416 that corresponds to the query provided in Table 2. Such displayed virtual item icons 422 indicate those virtual items 113 that have satisfied the corresponding query as input in a suitable UI by a player or game programmer. For player-defined filter 306 queries, the values as indicted in Table 2 can be altered by the player. For game-specified filter 306 queries, the values as indicated in Table 2 cannot be altered by the player.

TABLE 2

New Filter Queried Attributes and Selected Values

| Attribute | Value |
| --- | --- |
| Value | >$100 |
| Should Player Sell? | False |

Figure 5:
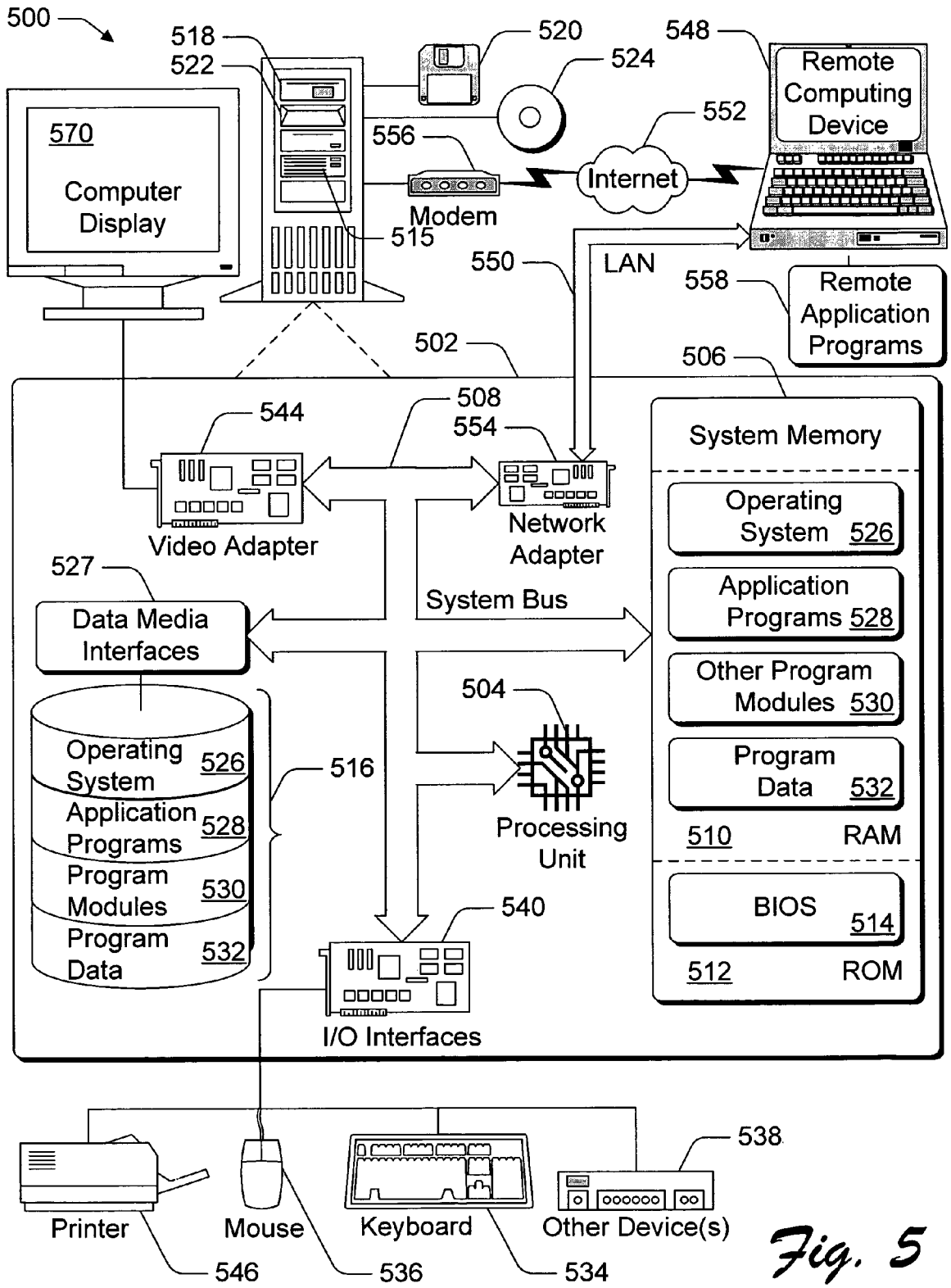
FIG. 5 is an embodiment of a computer environment on which the game system as shown in FIG. 1 can operate.

FIG. 5 illustrates an example of a suitable computer environment or network 500 that includes a user interface which can provide a game system 100 to a number of players, the game system including an inventory management portion 112. Similar resources may use the computer environment and the processes as described herein.

The computer environment 500 illustrated in FIG. 5 is a general computer environment, which can be used to implement the filtering techniques using the inventory management portion 112 as described herein. The computer environment 500 is only one example of a computer environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

The computer environment 500 includes a general-purpose computing device in the form of a computer 502. The computer 502 can be, for example, one or more of a stand alone computer, a networked computer, a mainframe computer, a PDA, a telephone, a microcomputer or microprocessor, or any other computer device that uses a processor in combination with a memory. The components of the computer 502 can include, but are not limited to, one or more processors or processing units 504 (optionally including a cryptographic processor or co-processor), a system memory 506, and a system bus 508 that couples various system components including the processor 504 and the system memory 506. The computer environment 500 can include wired portions and wireless portions.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 502 can include a variety of computer readable media. Such media can be any available media that is accessible by the computer 502 and includes both volatile and non-volatile media, and removable and non-removable media.

The system memory 506 includes the computer readable media in the form of non-volatile memory such as read only memory (ROM) 512, and/or volatile memory such as random access memory (RAM) 510. A basic input/output system (BIOS) 514, containing the basic routines that help to transfer information between elements within the computer 502, such as during start-up, is maintained in the ROM 512. The RAM 510 can contain data and/or program modules that are immediately accessible to, and/or presently operated on, by the processing unit 504.

The computer 502 may also include other removable/non-removable, volatile/non-volatile computer storage media. By way of example, FIG. 5 illustrates a hard disk drive 515 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 515, magnetic disk drive 518, and optical disk drive 522 are each connected to the system bus 508 by one or more data media interfaces 527. Alternatively, the hard disk drive 515, magnetic disk drive 518, and optical disk drive 522 can be connected to the system bus 508 by one or more interfaces (not shown).

The disk drives and their associated computer-readable media provide non-volatile storage of computer readable instructions, control node data structures, program modules, and other data for the computer 502. Although the example illustrates a hard disk within the hard disk drive 515, a removable magnetic disk 520, and a non-volatile optical disk 524, it is to be appreciated that other types of the computer readable media which can maintain for accessing data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 500.

Any number of program modules can be stored on the hard disk contained in the hard disk drive 515, magnetic disk 520, non-volatile optical disk 524, ROM 512, and/or RAM 510, including by way of example, the OS 526, one or more application programs 528, other program modules 530, and program data 532. Each OS 526, one or more application programs 528, other program modules 530, and program data 532 (or some combination thereof) may implement all or part of the resident components that support the distributed file system.

A player can enter commands and information into the computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor, flat panel display, or other type of computer display 570 can also be connected to the system bus 508 via an interface, such as a video adapter 544. In addition to the computer display 570, other output peripheral devices can include components such as speakers (not shown) and a printer 546 which can be connected to the computer 502 via the input/output interfaces 540.

The computer 502 can operate in a networked environment using logical connections to one or more remote computers, such as a remote computer device 548. By way of example, the remote computer device 548 can be a personal computer, portable computer, a server, a router, a network computer, a peer device or other common network node, game console, and the like. The remote computer device 548 is illustrated as a portable computer that can include many or all of the elements and features described herein relative to the computer 502.

Logical connections between the computer 502 and the remote computer device 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 can includes a modem 556 or other means for establishing communications over the wide network 552. The modem 556, which can be internal or external to the computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with the computer environment 500, program modules depicted relative to the computer 502, or portions thereof, may be stored in a remote memory storage device. By way of example, remote application programs 558 reside on a memory device of the remote computer 548. For purposes of illustration, application programs and other executable program components such as the operating system are illustrated herein as discrete Web blocks, although it is recognized that such programs and components reside at various times in different storage components of the computer 502, and are executed by the data processor(s) of the computer 502. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects, components, control node data structures, etc. that perform particular tasks or implement particular abstract data types. Often, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The term "communication media" includes, but is not limited to, computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 6:
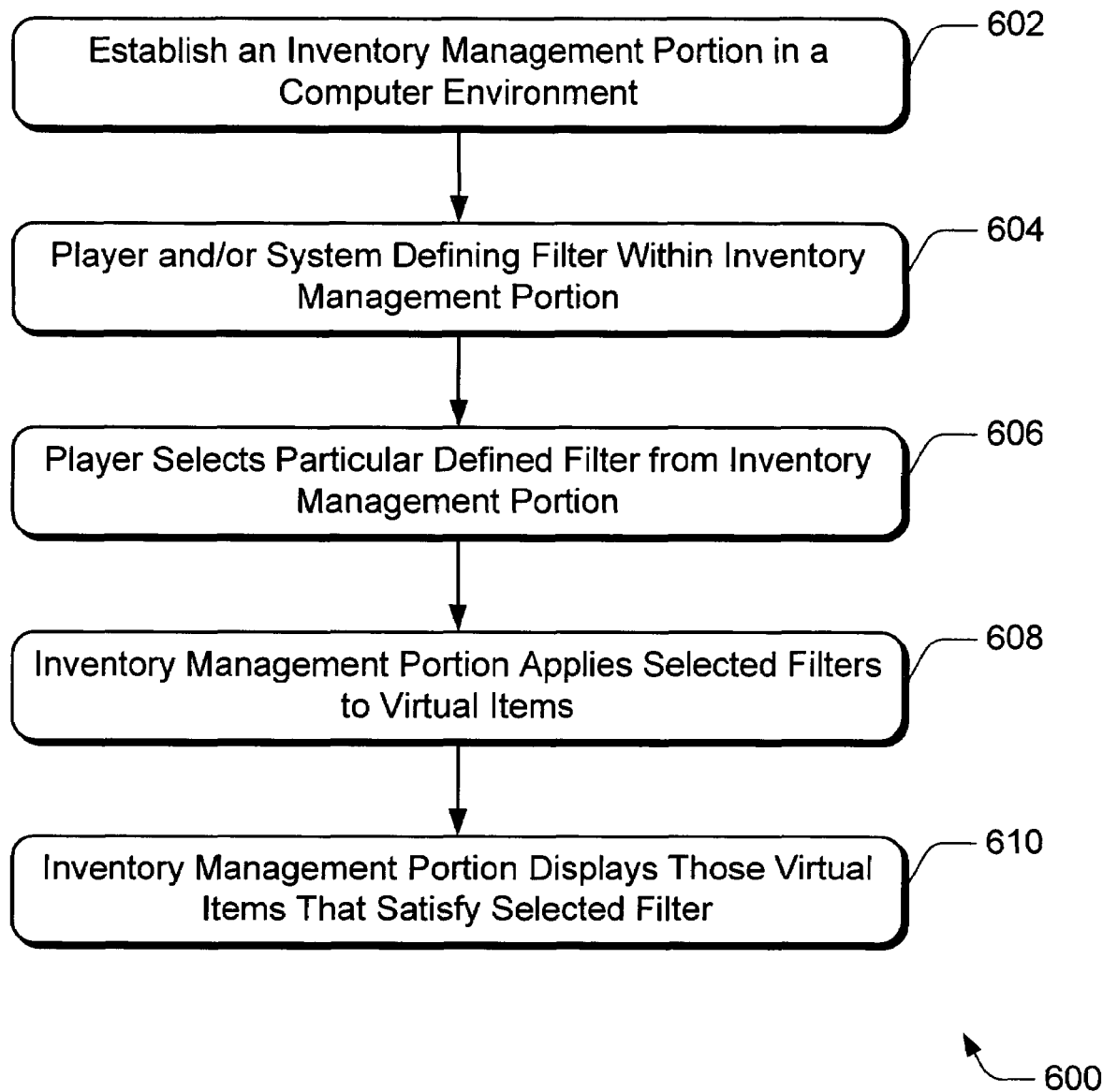
FIG. 6 is an exemplary flow chart of a game inventory process using the inventory management portion as shown in FIGS. 1 and/or 2.

One illustrative version of a game inventory process 600 is described relative to FIG. 6. 600 such as performed by the game system as shown in FIGS. 1, 2, and/or 3. The game inventory process 600 includes 602 that establishes the inventory management portion 112 as described relative to FIGS. 1, 2, 3, and 4. The inventory management portion may be included in the game server 108 and/or the game unit 104.

The game inventory process 600 continues to 604 in which the player, a game developer, a system manager, or a third party defines the filter(s) 306 within the inventory management portion. In 606, the player selects a particular filter 306 to apply to the virtual items. In 608, the inventory management portion applies the selected filter 306 against the virtual items. In 610 of the game inventory process 600, those virtual items that satisfy the selected filter 306 (selected in 606), are displayed to the player.

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
  operating, on a computing device comprising an electronic display, a computer game inventory management system to manage display of a game inventory of a plurality of virtual objects acquired during computer game play on the computing device as a function of computer-executable instructions that configure a processor to perform operations comprising:
    indicating to a game player, on the electronic display during computer game play, the plurality of computer generated virtual objects in a graphical scene describer of a game display, the graphical scene describer used to illustrate a computer generated representation of a player character that is interacting with one or more characters within a virtual world in the computer game play, the player character controlled by the game player, wherein the plurality of virtual objects are configured in the computer game play:
      to be obtained as possessions by the computer generated representation of the player character; and
      to comprise one or more attributes;
    collecting, in the graphical scene describer of the game display, the plurality of virtual objects using the computer generated representation of the player character;
    indicating, on the game display, at least a portion of the collected plurality of virtual objects as being possessed with the computer generated representation of the player character;
    displaying, on the game display, an inventory management describer in addition to the graphical scene describer of the game display, the inventory management describer comprising:
      one or more filter icons that represent one or more filters; and
      an inventory display that is used to display the filtered plurality of virtual objects;

receiving, in the computer game play, an input via an input device from the game player, the input used to activate a filter of the one or more filters, the activation comprising selecting, in the inventory management describer, a filter icon that represents the filter;

filtering, upon receiving the input from the game play to activate the filter, the collected plurality of virtual objects based on their respective attributes that are assigned during the computer game play, the filtering comprising filtering the collected plurality of virtual objects that match the filter that is activated by the game player; and displaying, upon activation of the filter, a filtered portion of the collected plurality of virtual objects in the inventory display, wherein each of the filtered portion of the plurality of virtual objects in the inventory display includes at least an attribute that matches the filter, and wherein display of the filtered portion of the plurality of virtual objects based on the filter activated by the game player facilitates the game player to determine which of the plurality of virtual objects to be disposed of or used in the computer game play as the computer generated representation of the player character interacts with the one or more characters in the virtual world in the graphical scene describer of the game display.

2. The method of claim 1, further comprising:

indicating, in the graphical scene describer of the game display, other computer generated representations as the one or more characters in the game; and displaying the computer generated representation of the player character and the other computer generated representations as animated characters.

3. The method of claim 1, further comprising:

constructing a first filter and a second filter from the one or more filters, wherein the first filter filters the plurality of virtual objects based on a flag type attribute and the second filter filters the plurality of virtual objects based on an enumeration type attribute; and filtering with the first filter and the second filter the plurality of virtual objects based on their attributes.

4. The method of claim 3, wherein construction of the first filter is performed by the game player and construction of the second filter is performed by a game developer.

5. The method of claim 4, further comprising selecting, by the game player, either the first filter or the second filter to obtain the plurality of virtual objects based on their attributes that are assigned during the computer game play.

6. The method of claim 3, wherein each of the one or more filters is used to select the plurality of virtual objects that have associated attributes that match different predetermined attributes associated with the respective filter.

7. The method of claim 3, wherein the filtering is executed with one of the one or more filters, and wherein a portion of the one or more filters includes one or more queries that are defined by the game player, and another portion of the one or more filters includes queries that are defined by the game developer.

8. The method of claim 7, wherein only a portion of the plurality of virtual objects that satisfy a query that corresponds to the filter is selected by the filter.

9. The method of claim 8, wherein the query includes a structured query language (SQL) query.

10. The method of claim 3, further comprising:

enabling the first filter to filter a first virtual object; and altering the attribute of the first virtual object to enable the second filter to filter the virtual object and to disable the first filter from filtering the first virtual object.

11. The method of claim 1, further comprising selecting a virtual item icon within the inventory display to display the virtual object that corresponds to the virtual item icon.

12. The method of claim 1, wherein the filter is displayed as a component of a user interface.

13. The method of claim 1, wherein a mouse is used to select the filter.

14. The method of claim 1, wherein a joystick is used to select the filter.

15. The method of claim 1, wherein a computer display button is used to select the filter.

16. The method of claim 1, wherein a computer display menu is used to select the filter.

17. The method of claim 1, wherein the filter is represented by a name.

18. The method of claim 1, wherein the filter is represented by a symbol.

19. The method of claim 1, wherein the collected plurality of virtual objects are indicated as being possessed using a virtual bag that is displayed on the game display.

20. The method as recited in claim 1 further comprising indicating on the game display that during play of the game the computer representation of the player character uses one of the filtered obtained plurality of virtual objects.

21. The method as recited in claim 1 further comprising exchanging one of the filtered virtual objects between the player character and the one or more other characters for value.

22. The method as recited in claim 1 wherein the plurality of virtual objects are obtained as possessions by the computer generated representation of the player character from other computer generated representations of the other one or more characters.

23. The method as recited in claim 1 wherein the filtering comprises querying the attributes that are selected from a group of queries comprising:

determining that the virtual objects are to be sold and/or bartered, determining that the virtual objects are weapons against monsters, and determining that the virtual objects are constructed of a particular material.

24. An electronic device including a game display comprising:

virtual item icons used to indicate a plurality of virtual objects collected by a computer generated representation of a player character during play of a computer game, the player character controlled by a game player, the collected plurality of virtual objects configured to be obtained as possessions by the player character, and at least a portion of the plurality of virtual objects comprising attributes that are assigned during play of the computer game;

a graphical scene describer used to illustrate a computer generated representation of the player character that is interacting with one or more characters within a virtual world in the play of the computer game; and an inventory management describer comprising:

an inventory filter icon used to represent a filter, wherein the filter is activated to filter the collected plurality of virtual objects that match the filter when the inventory filter icon is selected by the game player; and a filter result display used to display, in response to activation of the filter, one or more filtered virtual item icons, each of the one or more filtered virtual item icons used to display the filtered plurality of virtual objects that include the attributes that are assigned during play of the computer game and match the filter that is represented by the inventory filter icon;

wherein display of the at least one of the filtered plurality of collected virtual objects in response to the filter facilitates the game player to determine which of the plurality of collected virtual objects to be disposed of or used in the play of the computer game as the computer generated representation of the player character interacts with the one or more characters in the virtual world in the graphical scene describer of the game display.

25. The electronic device of claim 24, wherein dragging, with an input device, one of the virtual item icons that is associated with one of the virtual objects to a different inventory filter icon in the inventory management describer alters the attributes of the one of the virtual objects such that the altered attributes of the one of the virtual objects match a different filter that is represented by the different inventory filter icon.

26. The electronic device of claim 24, wherein the game player defines the inventory filter icon.

27. The electronic device of claim 24, wherein a game developer defines the inventory filter icon.

28. The electronic device of claim 24, wherein the computer game is operative to search the plurality of virtual objects for the computer game, and the game display displays only one or more virtual objects that satisfy search criteria as set forth by the attributes that are filtered based on queries that are associated with the inventory filter icon.

29. The electronic device of claim 24, wherein the game player provides attributes and selects a portion of the plurality of virtual objects based on the criteria that use a user interface.

30. The electronic device of claim 24, wherein the computer game highlights the attributes of certain desirable virtual objects to the player character in the graphical scene describer.

31. The electronic device of 24, wherein the electronic device is a game server operative to couple with a plurality of game computers running the computer game.

32. The electronic device of claim 24, wherein the virtual objects are obtained as possessions by displaying that the computer representations of the player character captures the virtual objects from computer representations of other characters during the play of the computer game.

33. The electronic device of claim 24, wherein the electronic device searches the plurality of virtual objects for attributes that are assigned during play of the computer game and that satisfy a predetermined search criteria, and wherein the electronic device displays only a portion of virtual objects that satisfy search criteria as set forth by the attributes that are filtered as a result of selection of the inventory filter icon.

34. A computer readable medium storing computer executable instructions which, when executed by a processor, configure the processor to perform actions comprising:

indicating to a game player, on the electronic display during computer game play, the plurality of computer generated virtual objects in a graphical scene describer of a game display, the graphical scene describer used to illustrate a computer generated representation of a player character that is interacting with one or more characters within a virtual world in the computer game play, the player character controlled by the game player, wherein the plurality of virtual objects are configured in the computer game play:
to be obtained as possessions by the computer generated representation of the player character; and
to comprise one or more attributes;

collecting, in the graphical scene describer of the game display, the plurality of virtual objects using the computer generated representation of the player character;

indicating, on the game display, at least a portion of the collected plurality of virtual objects as being possessed with the computer generated representation of the player character;

displaying, on the game display, an inventory management describer in addition to the graphical scene describer of the game display, the inventory management describer comprising:
one or more filter icons that represent one or more filters; and
an inventory display that is used to display the filtered plurality of virtual objects;

receiving, in the computer game play, an input via an input device from the game player, the input used to activate a filter of the one or more filters, the activation comprising selecting, in the inventory management describer, a filter icon that represents the filter;

filtering, upon receiving the input from the game play to activate the filter, the collected plurality of virtual objects based on their respective attributes that are assigned during the computer game play, the filtering comprising filtering the collected plurality of virtual objects that match the filter that is activated by the game player; and displaying, upon activation of the filter, a filtered portion of the collected plurality of virtual objects in the inventory display, wherein each of the filtered portion of the plurality of virtual objects in the inventory display includes at least an attribute that matches the filter, and wherein display of the filtered portion of the plurality of virtual objects based on the filter activated by the game player facilitates the game player to determine which of the plurality of virtual objects to be disposed of or used in the computer game play as the computer generated representation of the player character interacts with the one or more characters in the virtual world in the graphical scene describer of the game display.

35. The computer readable medium comprising computer executable instructions of claim 34, wherein the actions further comprise constructing the filter via a user interface.

36. The computer readable medium comprising computer executable instructions of claim 34, wherein the game player defines the filter.

37. The computer readable medium comprising computer executable instructions of claim 34, wherein a game developer of the game defines the filter.

38. The computer readable medium comprising computer executable instructions of claim 34, wherein a portion of the plurality of filters is defined by the game player, and another portion of the plurality of filters is defined by a game developer, and wherein the game player selects which of the plurality of filters are to be applied to the inventory.

* * * * *